United States Patent [19]

Hara

[11] Patent Number: 5,351,910

[45] Date of Patent: Oct. 4, 1994

[54] DUST FREE TAPE CASSETTE AND MAGNETIC RECORDING APPARATUS

[75] Inventor: Mitsuhiko Hara, Yokohama, Japan

[73] Assignee: Victor Company of Japan, Yokohama, Japan

[21] Appl. No.: 948,156

[22] Filed: Sep. 21, 1992

[30] Foreign Application Priority Data

Sep. 25, 1991 [JP] Japan .................................. 3-273185
Dec. 12, 1991 [JP] Japan .................................. 3-351402

[51] Int. Cl.$^5$ ........................................ G11B 23/087
[52] U.S. Cl. ............................... 242/342; 242/347.1; 360/96.3; 360/132
[58] Field of Search ............................... 242/197–199, 242/200–201; 360/132, 96.3

[56] References Cited

U.S. PATENT DOCUMENTS

| 3,536,277 | 10/1970 | Fukuda | 242/199 |
| 4,504,876 | 3/1985 | Nagaoka | 242/198 |
| 4,625,253 | 11/1986 | Kawakami et al. | 242/198 |
| 4,836,465 | 6/1989 | May et al. | 242/198 |

FOREIGN PATENT DOCUMENTS 52-76912 6/1977 Japan .
60-44740 10/1985 Japan .

Primary Examiner—Daniel P. Stodola
Assistant Examiner—John Q. Nguyen
Attorney, Agent, or Firm—Michael N. Meller

[57] ABSTRACT

Dust free tape cassette comprises a cassette case and a front lid for holding protectively therein a magnetic tape being wound on reels which are supported by a pair of shafts stationary provided in the cassette case. A loading pocket being open at a bottom of the cassette case for accepting tape drawing members and reel driving members of tape recording/playback apparatus, is provided behind the front lid. The loading pocket has a rear wall which partitions the reels off the loading pocket, wherein reel flanges which may have gear portions partly protrude into the loading pocket through windows provided on the rear wall so that the magnetic tape housed in the cassette case is well protected from dust invasion and abuse thereof when not loaded into the apparatus, and when loaded the reel driving members enter into the loading pocket and engage with the flanges at their protruded portions to drive thereof. A slidable dust shield is provided for closing and exposing the loading pocket. An apparatus for using the above cassette is also disclosed.

4 Claims, 10 Drawing Sheets

Fig.1 (A) PRIOR ART
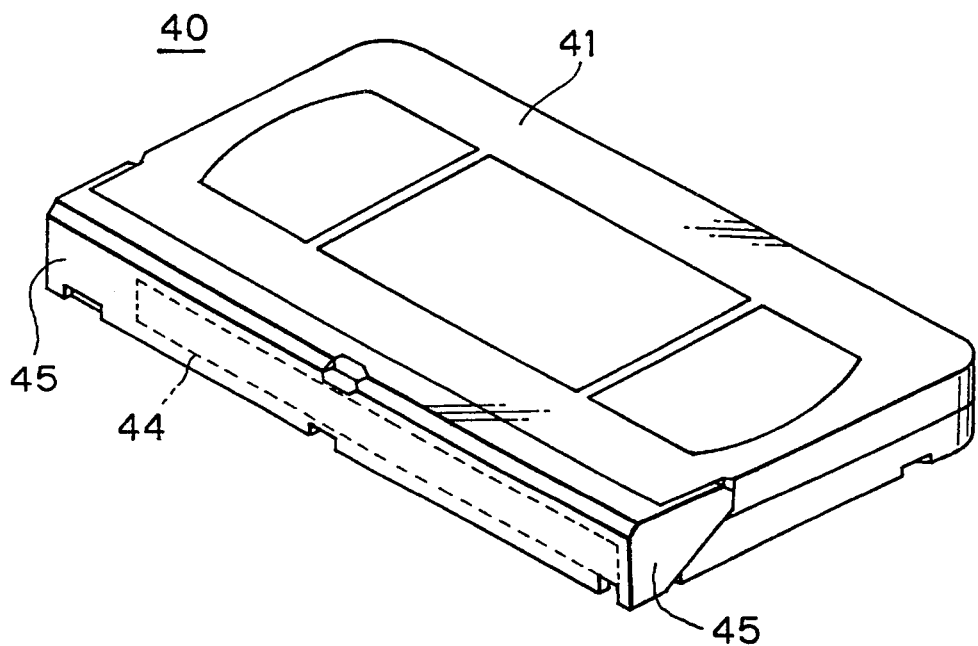
Fig.1 (B) PRIOR ART
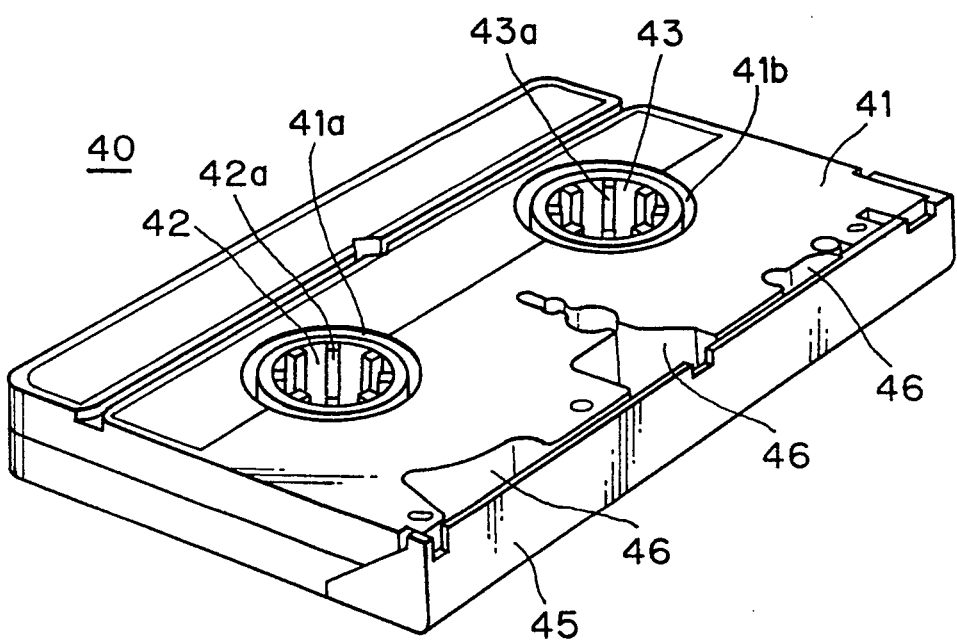

$X_1 \longleftrightarrow X_2$

DUST FREE TAPE CASSETTE AND MAGNETIC RECORDING APPARATUS

BACKGROUND OF THE INVENTION

1. Field of the Invention

The present invention relates to an improved tape cassette having a dust free construction and a magnetic recording apparatus for the tape cassette.

2. Description of the Prior Art

FIGS. 1(A) and 1(B) respectively show a top perspective view and a bottom perspective view of conventional tape cassette.

A tape cassette 40 of conventional construction shown in the FIGS. 1(A) and 1(B) has a cassette case 41 in which a supply reel 42 and a take-up reel 43 are housed, holding a magnetic tape 44 wound around the reels. The cassette case 41 has a lid 45 provided in front thereof, behind of which the magnetic tape 44 is extended. The lid 45 swings to open to expose the magnetic tape 44 when the tape cassette 40 is loaded into a magnetic tape recording apparatus (not shown and hereinafter referred to as the "tape apparatus"). The lid 45 provided at a front of the cassette case 41, is kept closed to protect the magnetic tape 44 unless the tape cassette 40 is loaded into the tape apparatus. The cassette case 41 is provided with a pair of reel openings 41a and 41b through which drive sockets 42a and 43a of the respective supply and take-up reels 42 and 43 are exposed to accept and engage with reel driving posts of the tape apparatus respectively, so that the magnetic tape 44 is driven to run between the supply and the take-up reels 42 and 43. The cassette case 41 is further provided with pockets 46 open at a bottom thereof, which accept tape loading members (not shown) of the tape apparatus upon loading the tape cassette 40 thereto allowing the tape loading members to pull the magnetic tape 44 out of the tape cassette 40 and to form a predetermined tape path within the tape apparatus.

The conventional tape cassette 40 has a structure of which the tape reels 42 and 43 are driven by engaging with the reel driving posts (reel tables) of the tape apparatus, which enter the cassette case 41 from a bottom thereof, for this reason, the tape apparatus is required to have such reel tables and driving mechanism therefor at a location of accepting the cassette case 41 loaded thereto, this limits a total height of the tape apparatus as well as miniaturization thereof in design. Further, reel openings 41a and 41b provided on the bottom of the cassette case 41 permit dust and foreign particles entering the cassette case 41, to which the magnetic tape 44 is subjected. In other words such a conventional tape cassette is inadequate to be dust free and to prevent a potential tape damage.

SUMMARY OF THE INVENTION

In order to prevent such problems, a dust free tape cassette of the present invention is featured that the tape cassette comprises a cassette case and a front lid for holding protectively a magnetic tape wound on tape reels housed in the cassette case. The tape reels are respectively supported by a pair of shafts stationary provided in the cassette case, and a part of the magnetic tape is extended behind the front lid which opens to expose the part of the magnetic tape to be drawn out of the tape cassette, the tape cassette further comprises a loading pocket provided behind the front lid and is open at a bottom of the cassette case to allow tape loading members of tape recording/playback apparatus entering the loading pocket to draw out the part of the magnetic tape upon loading the tape cassette into the apparatus, the loading pocket is provided with a rear wall which partitions the tape reels off the loading pocket, a part of flange of the tape reels, is partly protruded into the loading pocket to engage with reel driving members of the apparatus through windows provided on the rear wall of the loading pocket.

Another object of the present invention is to provide a dust free tape cassette which comprises a gear portion on a lower flange of the tape reels, and a part of the gear portion protrudes into the loading pocket to engage with the reel driving members of the apparatus.

Another object of the present invention is to provide a dust free tape cassette which comprises a gear portion on a lower flange of at least one of the tape reels, and a part of the gear portion protrudes into the loading pocket, which part is engageable with a reel driving member of the apparatus, and another part of the gear portion is exposed in a side pocket of the tape cassette, which another part is also engageable with a reel driving member of the apparatus.

The tape cassette having a dust free structure according to the present invention is further enhanced by a dust shield having no access openings to expose the tape reels, which dust shield is provided at a bottom of the cassette case, and is movable slidingly to close and expose the loading pocket.

Still another object of the present invention is to provide a tape recording/playback apparatus for using a tape cassette which comprises a cassette case and a front lid for holding protectively a magnetic tape wound on tape reels housed in the cassette case. The tape reels are respectively supported by a pair of shafts stationary provided in the cassette case, and a part of the magnetic tape is extended behind the front lid which opens to expose the part of the magnetic tape to be drawn out of the tape cassette, the tape cassette further comprises a loading pocket provided behind the front lid and is open at a bottom of the cassette case to allow tape loading members of the tape recording/playback apparatus entering the loading pocket to draw out the part of the magnetic tape upon loading the tape cassette into the apparatus, the loading pocket is provided with a rear wall which partitions the tape reels off the loading pocket, flanges of the tape reels, are partly protruded into the loading pocket to engage with reel driving members of the tape recording/playback apparatus through windows provided on the rear wall of the loading pocket.

Another object of the present invention is to provide a dust free tape cassette which comprises a pair of side pockets provided on both sides of the cassette case opened respectively at bottom side corners of the cassette case, and flanges of the tape reels are exposed in the side pockets to engage respectively with the reel driving members of the tape recording/playback apparatus.

Other objects and further features of the present invention will be apparent from the following detailed description with respect to preferred embodiments of the invention when read in conjunction with the accompanying drawings.

BRIEF DESCRIPTION OF THE DRAWINGS

FIGS. 1(A) and 1(B) respectively show top and bottom perspective views of conventional tape cassette.

DETAILED DESCRIPTION OF THE PREFERRED EMBODIMENTS

Tape cassette having a dust free structure and a magnetic recording apparatus according to the present invention will be described in detail with reference to the accompanying drawings.

Figure 2:
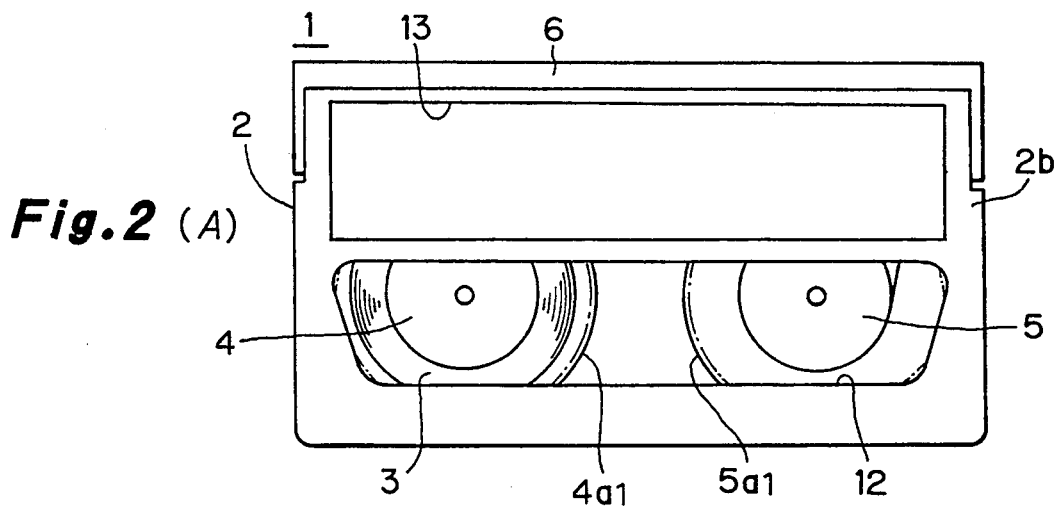
FIGS. 2(A), 2(B) and 2(C) respectively show top, front and bottom views of tape cassette according to a first embodiment of the present invention.
Figure 2:
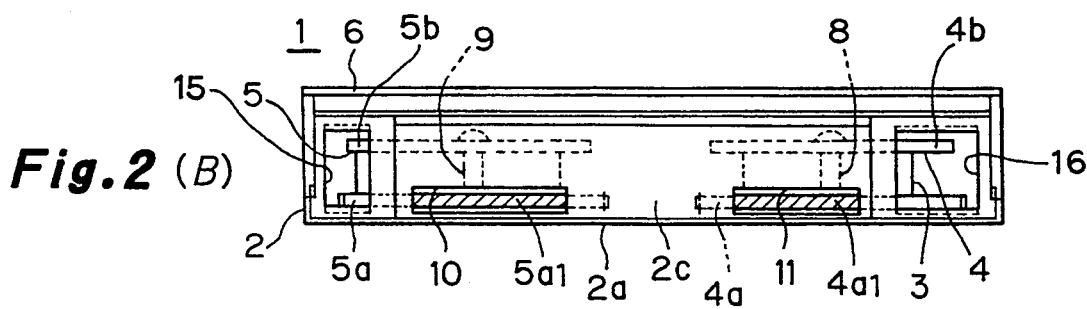
Figure 2:
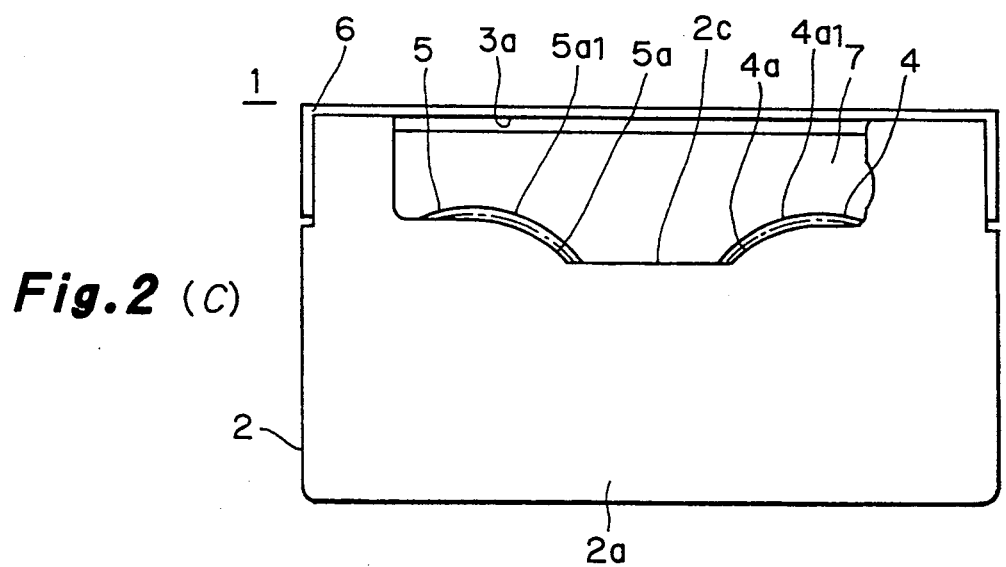
Figure 3:
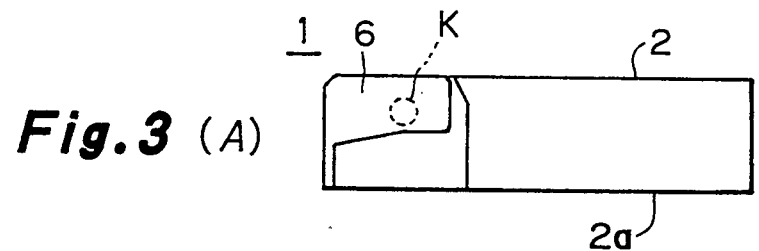
FIGS. 3(A) and 3(B) show the tape cassette according to the first embodiment shown in FIG. 2, of which a lid is closed and and open respectively.
Figure 3:
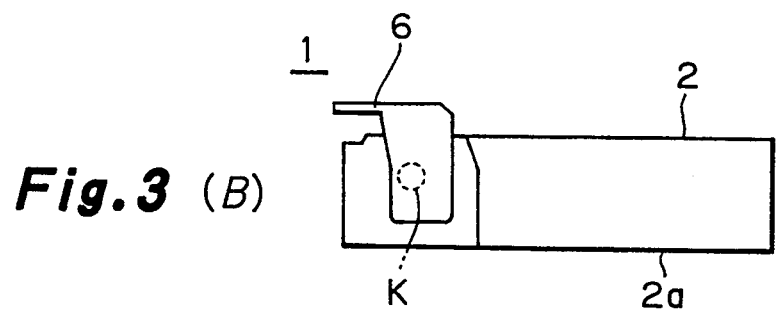

Tape cassette 1 shown in FIGS. 2(A) through 2(C), which is a first embodiment of the present invention, holds within its cassette case 2 a supply reel 4 and a take-up reel 5 on which a magnetic tape 3 is wound. As shown in FIG. 2(C), a part of the magnetic tape 3 is extended as an extended part 3a through windows 15 and 16 which will be explained later, the extended part 3a is located at a front area of the cassette case 2 but behind of a front lid 6 with its closed position. This extended part 3a is not shown in FIG. 2(B) in which the front lid 6 is at its opened position. As shown in FIGS. 3(A) and 3(B), the front lid 6 swings around a pivot K to close the cassette case 2 for protecting the magnetic tape 3 or to open for exposing the extended part 3a of the same.

Loading pocket 7 opened at a bottom plate 2a of the cassette case 2, is provided behind the extended part 3a of the magnetic tape 3, which allows tape loading members (not shown) or the like of the tape apparatus to enter for pulling the magnetic tape 3 out of the cassette case 2. AS shown in FIG. 2(C), a largest possible opening or a mouth is provided as the loading pocket 7 for accepting the loading members. Further, a rear wall 2c is provided to partition the loading pocket 7 off a chamber housing the supply and take-up reels 4 and 5, and windows 10, 11, 15 and 16 are provided on the rear wall 2c as shown in FIG. 2(B).

A pair of shafts 8 and 9 is provided within the cassette case 2, which supports respectively and rotatably the pair of supply and take-up reels 4 and 5. Lower flanges 4a and 5a of the respective supply and take-up reels 4 and 5 respectively have gear portions 4a1 and 5a1 to be driven at respective peripheries thereof. Diameter of the lower flange 4a or 5a may be same as or larger than a diameter of upper flanges 4b and 5b respectively. Parts of the gear portions 4a1 and 5a1 protrude respectively into the loading pocket 7 through the windows 10 and 11 while the upper flanges 4b and 5b are kept within the cassette case 2 behind the rear wall 2c. Blank space 13 for pasting an index label or the like and a transparent window 12 for monitoring a remaining amount of the magnetic tape 3 are provided on a top plate 2b of the cassette case 2.

Tape cassette having a structure explained above, allows the loading members and reel driving members of the tape apparatus to enter the loading pocket 7 and allows the reel driving members to engage respectively with the gear portions 4a1 and 5a1 upon loading the tape cassette 1 into the tape apparatus. Unlike the tape cassette 40 of conventional type as shown in FIG. 1, which requires tall bulky reel driving posts having respectively tables to drive and support the supply and take-up reels 42 and 43, and requires to be inserted from the underneath of the tape cassette 40, the tape cassette 1 of the present invention having the structure explained above requires reel driving members of very thin structure having no tables to engage with and drive the supply and take-up reels 4 and 5 within the loading pocket 7. This allows the tape apparatus to have a limited height, small number of components to drive the supply and take-up reels thus compact tape transport mechanism, accordingly, it contributes a miniaturization of the tape apparatus. Since the supply and take-up reels 4 and 5 are respectively supported on the stationary shafts 8 and 9 mounted on the cassette case 2 in contrast to the supply and take-up reels 42 and 43 of the conventional type are floated in the cassette case 41 with some clearances between the respective reel openings 41a and 41b, rotation of the supply and take-up reels 4 and 5 is quite smooth, and there is virtually no plays of the reels 4 and 5 with respect to the cassette case 2, a size of the windows 10 and 11 and clearances between the reels 4 and 5 and the respective windows 10 and 11 can be made minimum to minimize dust invasion.

Although the foregoing explanation of the present invention is given to a tape cassette which holds 2 reels within its cassette case, the present invention is applicable to a tape cassette which holds only one reel therein. Further, the present invention is not limited to a tape cassette from which a magnetic tape is pulled out, but is applicable to such as an audio compact tape cassette of which a magnetic tape is always transported within its cassette case.

Figure 4:
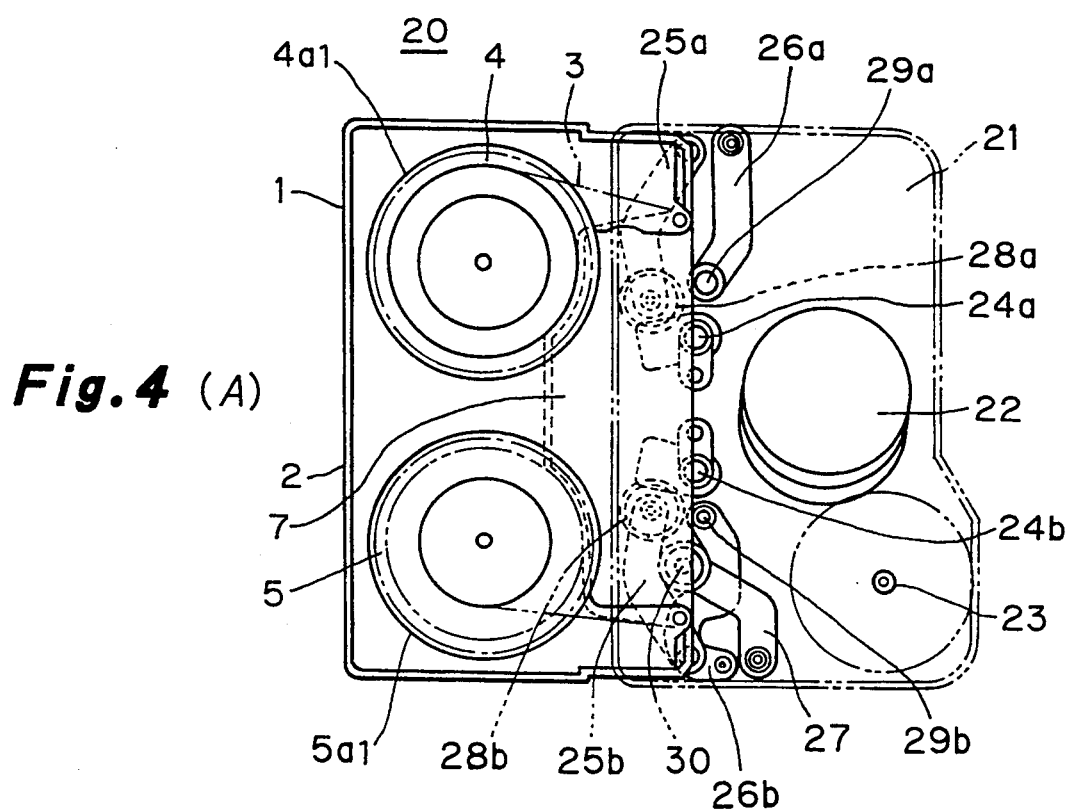
FIGS. 4(A) through 4(I) show how the tape cassette according to the first or the second embodiment shown in FIGS. 2 or 5, is loaded into a tape apparatus.
Figure 4:
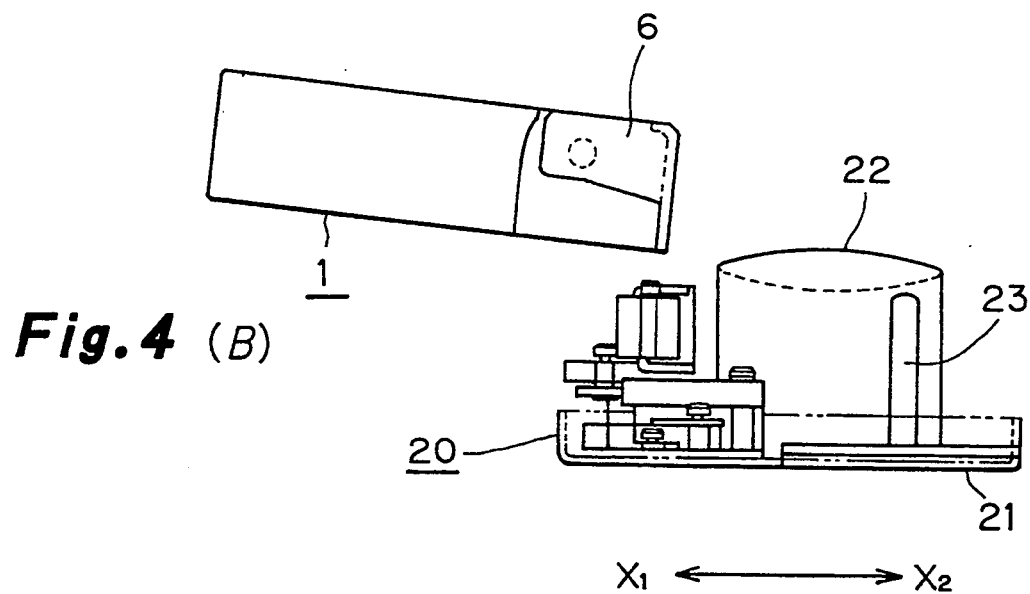
Figure 4:
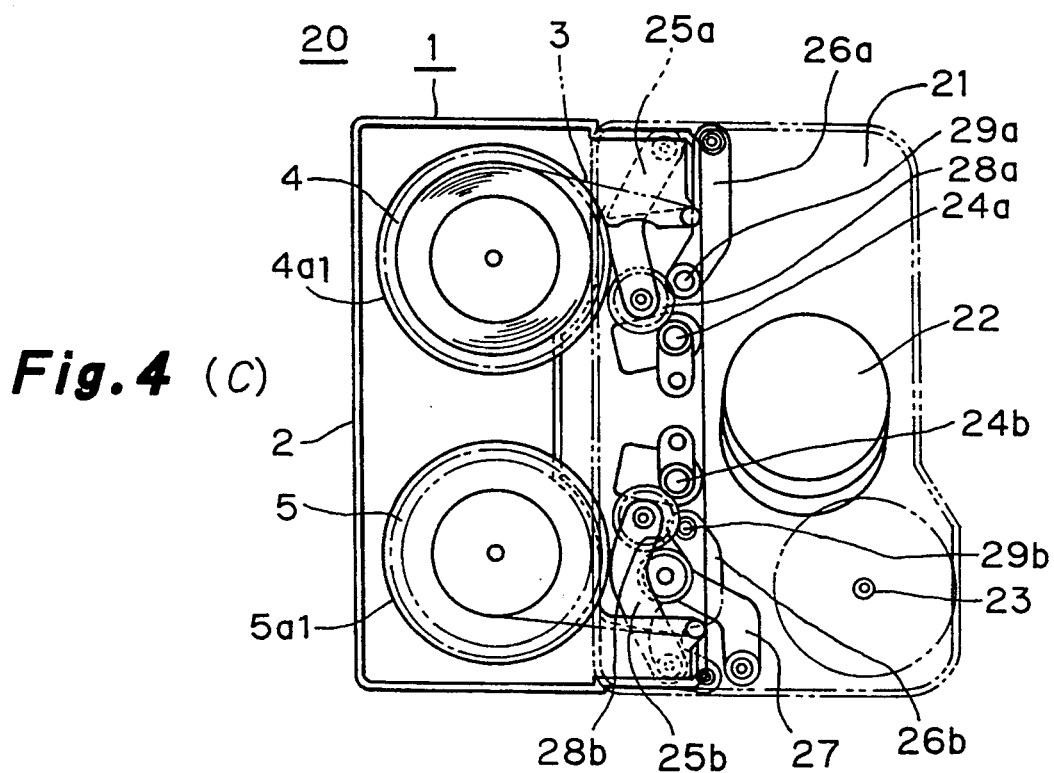
Figure 4:
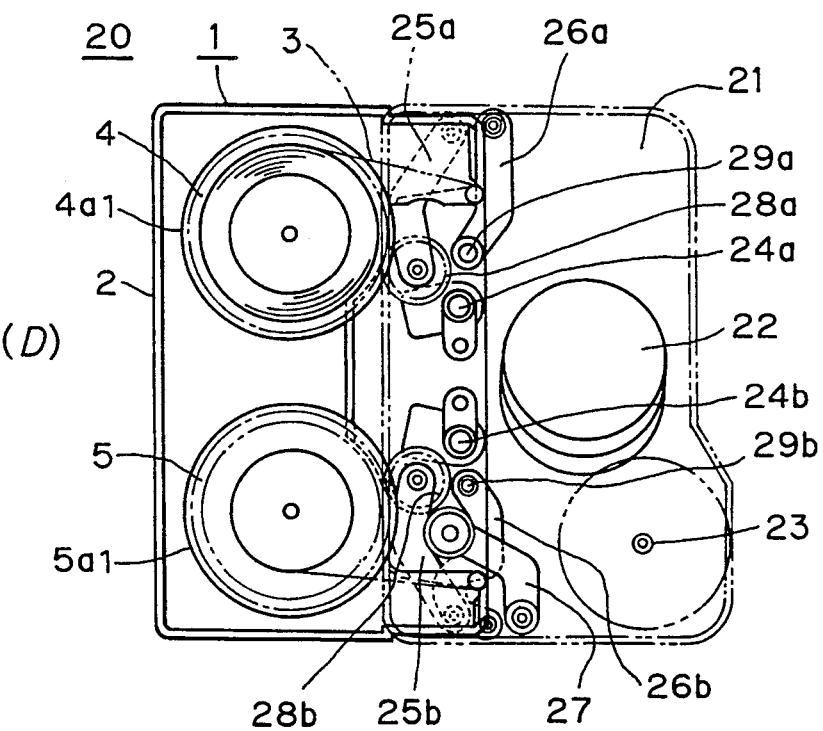
Figure 4:
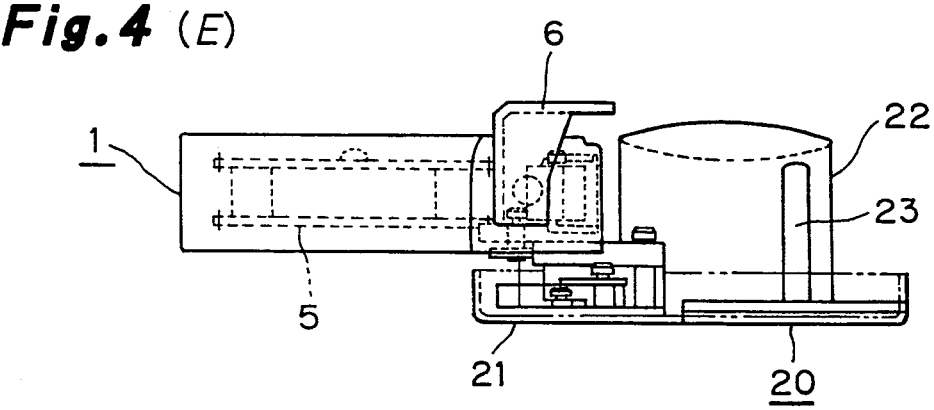
Figure 4:
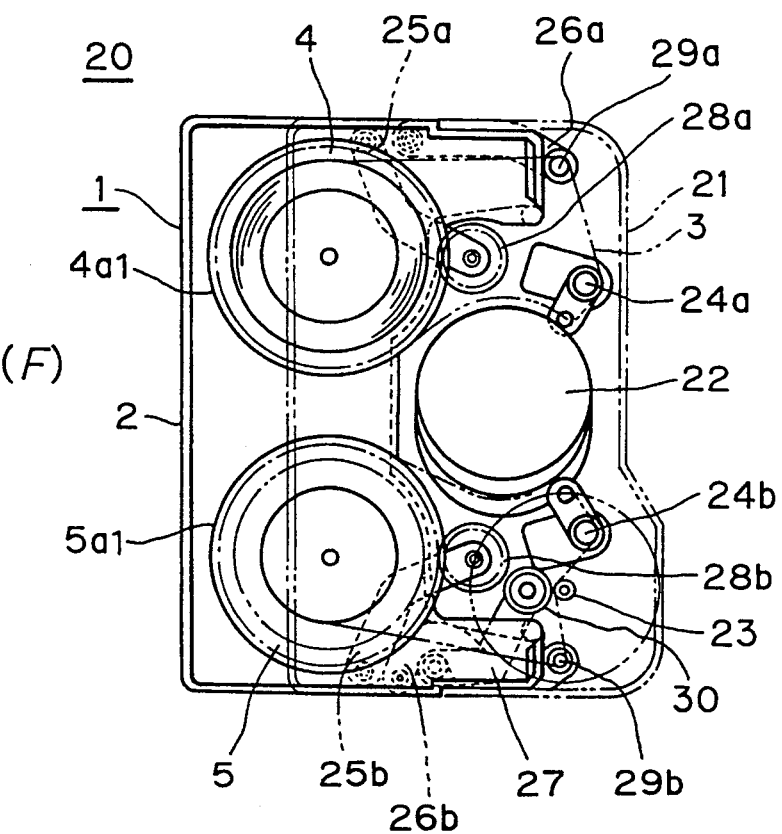
Figure 4:
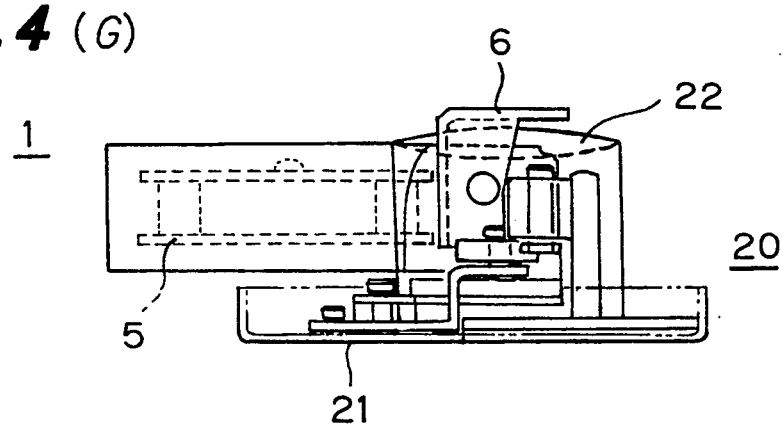
Figure 4:
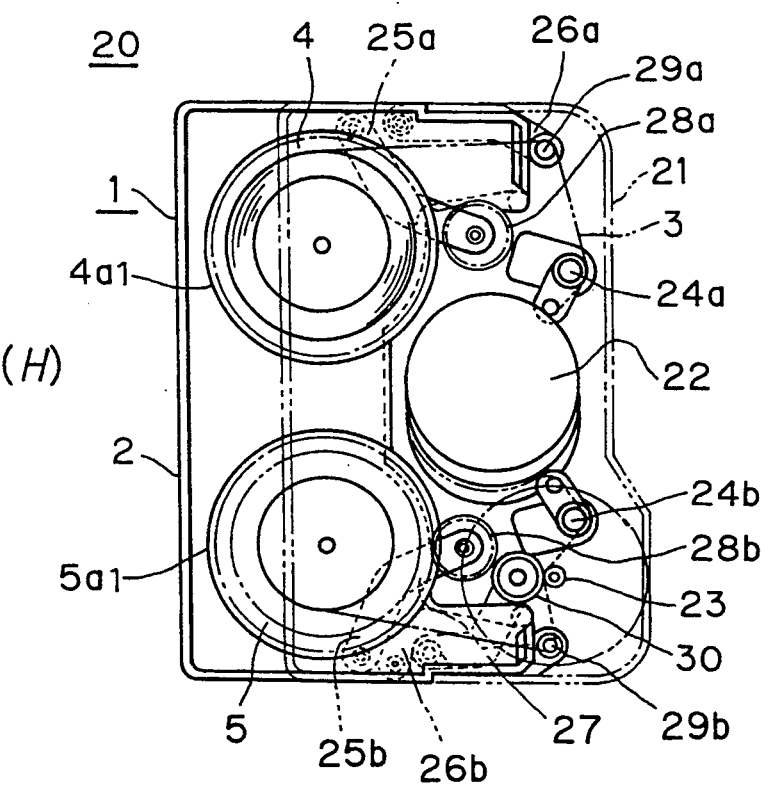
Figure 4:
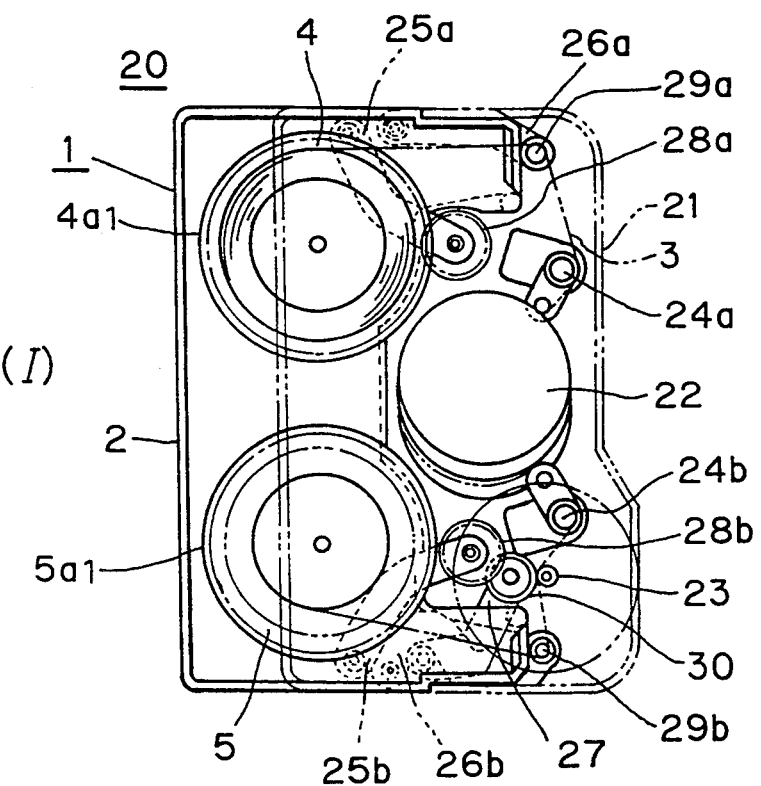

FIGS. 4(A) through 4(I) show how the tape cassette 1 of the present invention is loaded to the tape apparatus 20, in which FIG. 4(B) indicates a side view of FIG. 4(A), a similar relationship applies to combinations of FIG. 4(D) and FIG. 4(E), and FIG. 4(F) and FIG. 4(G).

In a tape apparatus 20 shown in these figures, a numeral 21 indicates a chassis, 22 rotary drum, 23 capstan, 24a and 24b tape loading members, 25a, 25b, 26a, 26b and 27 respectively indicate swing arms each of which is pivoted at a distal end thereof. 28a and 28b respectively indicate driving gears mounted respectively at swing ends of the swing arms 25a and 25b, where the driving gears 28a and 28b are connected to a driving source (not shown). 29a and 29b indicate a pair of tension/pull-out poles mounted respectively at swing ends of the swing arms 26a and 26b, 30 is a pinch roller mounted at a swing end of the swing arm 27.

FIGS. 4(A) and 4(B) show a status in which the tape cassette 1 is held within a cassette holder of known design (not shown) immediately after its loading to the cassette holder or immediately before its unloading out of the cassette holder.

The tape cassette 1 is guided or carried by the cassette holder starting from the above status. In this status, tape loading members 24a and 24b and the tension/pull-out poles 29a and 29b are at stand by positions as shown, which are ready for tape loading.

Starting from the above status, the tape cassette 1 descends being carried by the cassette holder as the driving gears 28a and 28b move to approach the supply and take-up reels 4 and 5. In this status, a mechanism (not shown) causes the swing arm 25a to rotate counterclockwise slightly and the swing arm 25b to rotate clockwise slightly to prevent them from colliding with the driving gears 28a and 28b with a known detecting system (not shown) which detects positions of the driving gears 28a and 28b where they are about to contact with the reels 4 and 5. For detecting these positions, an electrical method using an electric sensor or a mechanism linked to a cassette holder movement or a combination of both is conceivable.

After the tape cassette 1 has completely descended, the swing arms 25a and 25b respectively rotate toward the reels 4 and 5, and cause the driving gears 28a and 28b to contact and engage with the gear portions 4a1 and 5a1 respectively keeping predetermined distances between the contacting gears as shown in FIG. 4(D). Upon completion of the descent, the tape cassette 1 is precisely placed at a predetermined position of the chassis 21 being guided by positioning (including elevation) pins (not shown) and the front lid 6 is opened by an unshown mechanism of the tape apparatus 20.

In the above status and prior to a tape loading, a known reel brake system (not shown) provided on the tape cassette 1, is released by a brake release system (not shown) of the tape apparatus 20 to make the supply and take-up reels 4 and 5 freely rotatable in the tape cassette 1. It may be designed as such that upon engagement of the driving gears 28a and 28b with the gear portions 4a1 and 5a1 respectively, either of the driving gears 28a or 28b rotates slightly to take up a slack of the magnetic tape 3, which may be developed then.

Subsequently after the above status, as shown in FIG. 4(F), the swing arm 26a carrying the tension/pull-out pole 29a rotates counterclockwise and the swing arm 26b carrying the tension/pull-out pole 29b rotates clockwise, and almost concurrently, the swing arm 27 carrying the pinch roller 30 rotates clockwise all caused by an unshown but known mechanism of the tape apparatus 20. Further, the tape loading members 24a and 24b move toward the rotary drum 22 by an unshown but known mechanism of the tape apparatus 20, concurrently, the tape cassette 1 is displaced toward the rotary drum 22 by an unshown horizontal displacement mechanism of the tape apparatus 20.

According to the above functional movements, the magnetic tape 3 is pulled out from the loading pocket 7, then is wrapped around the rotary drum 22 in a predetermined angular range and depressed against the rotary drum 22 by the tape loading members 24a and 24b concurrently with a completion of the horizontal displacement of the tape cassette 1 explained before, also, a part of pulled out tape is interposed between the capstan 23 and the pinch roller 30, so that a predetermined tape path of the magnetic tape 3 is formed as a fully loaded status a side elevation view of which is illustrated as FIG. 4(G). When the magnetic tape 3 is rolled out from the respective tape reels, each of the supply and the take-up reels is applied with a slight reverse torque so that a development tape slack while being rolled out, is prevented.

Next individual operational modes will be explained.

In a recording/playback mode, as shown in FIG. 4(H), the swing arm 25a rotates counterclockwise from the above fully loaded status, and the supply reel 4 is disengaged from the driving gear 28a to become rotatable passively. Under this condition, the capstan 23 is driven and the driving gear 28b rotates the take-up reel 5 clockwise so that the magnetic tape 3 is transported from the supply reel 4 to the take-up reel 5. The same is true in a fast-forward mode unless the tape speed becomes quite high (few tens to few hundreds times a normal speed). That is, up to a predetermined tape speed (few times the normal speed) the pinch roller 30 is kept contacting the running tape, but over the predetermined tape speed, the pinch roller 30 is displaced away from the capstan 23 caused by a movement of the swing arm 27. The magnetic tape 3 is stopped in a status shown in FIG. 4(H), when the operational mode changes from the "fast forward" or the "recording/playback" to a still picture mode.

FIG. 4(I) shows a status of rewind mode, starting from the fully loaded status, the swing arm 25b rotates clockwise for disengaging the driving gear 28b from the take-up reel 5 to free the take-up reel 5. The supply reel 4 is caused to rotate counterclockwise driven by the driving gear 28a, concurrently, the capstan 23 is driven reversely so that the magnetic tape 3 is wound on the supply reel 4 as transported from the take-up reel 5. A capstan control related to the tape speed similar to that of in the fast forward mode, is also performed in this rewind mode with a displacement of the swing arm 27. The magnetic tape 3 is stopped in the status of FIG. 4(I) when the mode is switched from the "rewind" to the "still picture".

In all of the recording/playback, fast forward, rewind and still picture modes, the magnetic tape 3 is kept contacted with a tape running surface of the rotary drum 22, in other words, the above modes are performed with the magnetic tape in the "fully loaded" status.

It should be noted that since this tape apparatus 20 employs no reel tables but driving gears 28a and 28b instead of conventional reel driving posts with tables for driving the supply and take-up reels, a depth in a direction indicated by $X_1 \leftarrow \rightarrow X_2$ in FIG. 4(B) can be short which contributes to downsize the tape apparatus 20 and to simplify its tape transport mechanism very much. Further, on the tape cassette 1 shown in FIGS. 2(A) through 2(C), limited parts of the lower flange 4a and 5a are exposed to the loading pocket 7 through the windows 10 and 11. Note that those windows 10, 11, 15 and 16 are all located within the cassette case 2, in addition, the windows 15 and 16 are opened just behind the front lid 6 being covered by the magnetic tape 3 and the front lid 6 and no openings are provided on an outer surface of the cassette case 2, therefore a probability of dust invasion and abuse of the magnetic tape 3 housed inside, is minimized quite effectively.

Figure 5:
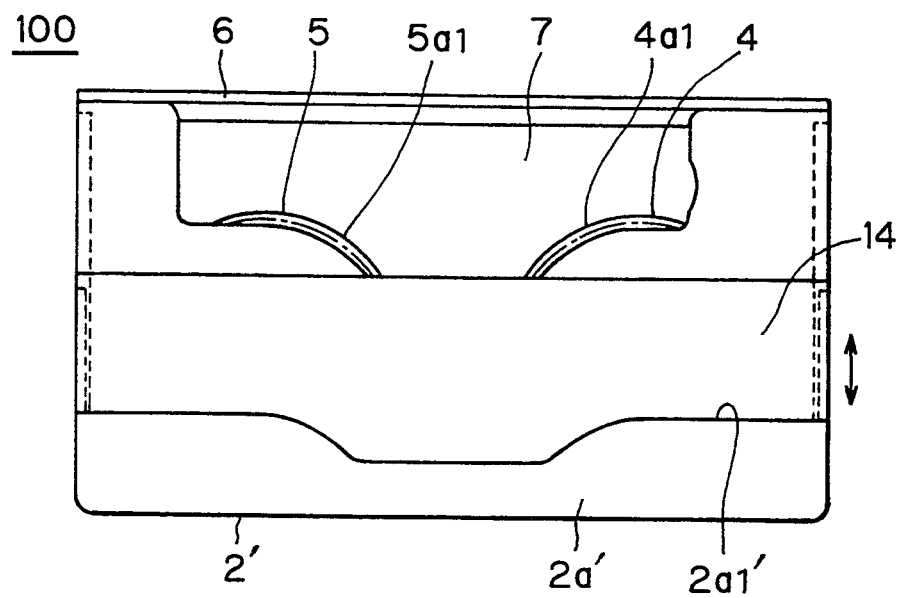
FIGS. 5(A) and 5(B) show a tape cassette according to a second embodiment of the present invention, which is a modified version of the first embodiment shown in FIG. 2.
Figure 5:
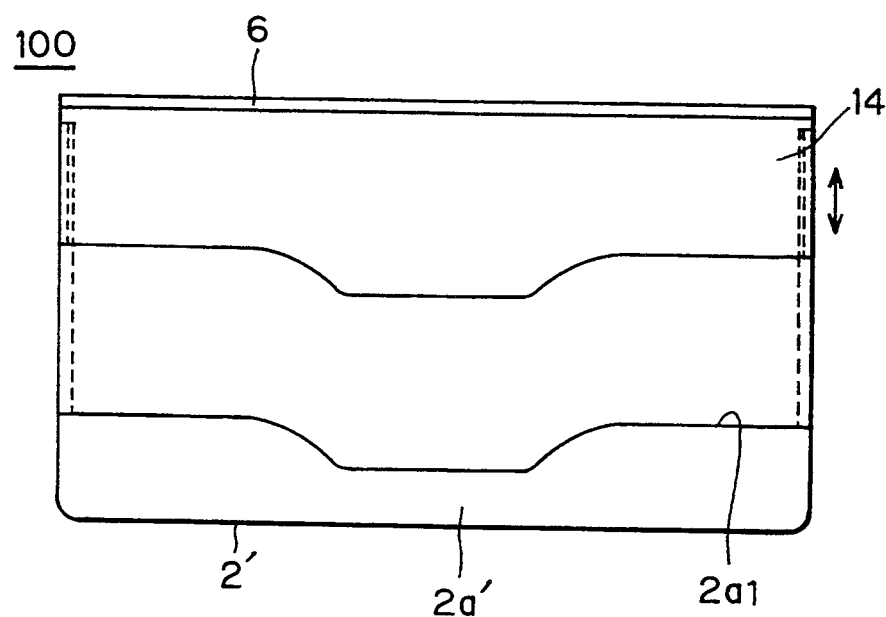

As a further improvement, a tape cassette 100 which is a second embodiment of the present invention, is shown in FIGS. 5(A) and 5(B), on which a sliding shutter 14 is additionally provided. The dust shield 14 moves fore and aft along a body of the cassette case 2 to expose and close the loading pocket 7 respectively upon loading and unloading of the tape cassette 100 to and from the tape apparatus as shown respectively in FIGS. 5(A) and 5(B) so that dust proofing of the tape cassette 100 is further secured. 2a1 in FIGS. 5(A) and 5(B) is a shoulder provided to restrict a sliding movement of the dust shield 14.

Regarding this kind of dust proof shutter, an R-DAT (Rotary head type Digital Audio Tape system) cassette is known as disclosed in the Japanese laid-open patent application 60-63779/1985. On the R-DAT cassette, a sliding shutter called "slider" having two access openings, is provided for normally closing a loading pocket as well as two bottom holes of the R-DAT cassette designed to accept reel driving posts of a tape apparatus (R-DAT). Loading of the R-DAT cassette into the tape apparatus causes the slider to displace and reveal the loading pocket as well as the two bottom holes as the two access openings correspondingly coincide with the two bottom holes so that the tape reels within the R-DAT cassette become accessible respectively to the reel driving posts of the tape apparatus through the two access openings on the slider and two bottom holes of the R-DAT cassette. This structure of the slider having the two access openings, requires to have a certain amount of displacement stroke so that the two access openings and the two bottom holes do not respectively overlap each other unless the R-DAT cassette is loaded into an intended apparatus In contrast to this R-DAT type cassette, the sliding shutter 14 of the tape cassette of present invention shown in FIGS. 5(A) and 5(B), does not have such access openings, therefore no consideration of displacement stroke for other than closing the loading pocket 7, is required, this presents a wider design flexibility and contributes to a miniaturization of tape cassettes.

Figure 6:
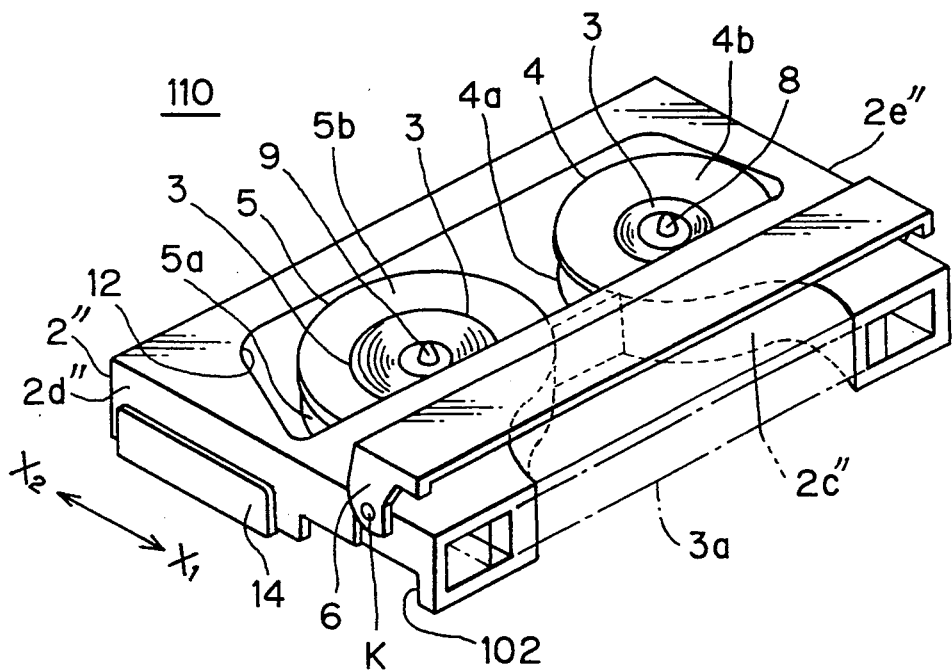
FIGS. 6(A) and 6(B) show a tape cassette according to a third embodiment of the present invention, which is a modified version of the second embodiment shown in FIG. 5.
Figure 6:
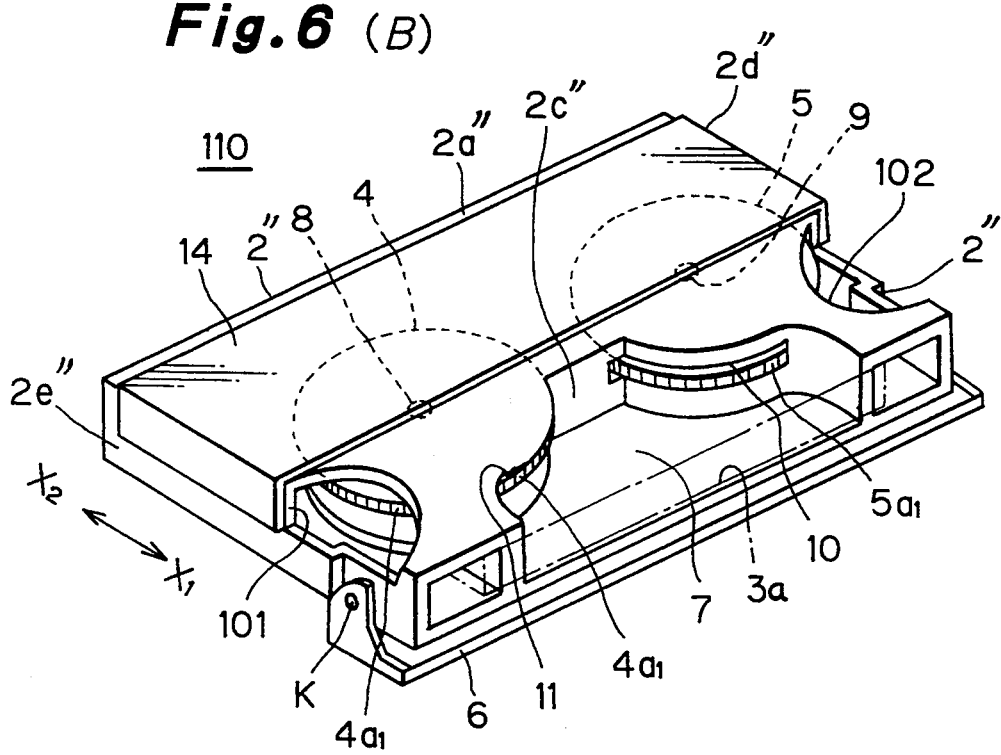

FIGS. 6(A) and 6(B) show a tape cassette 110 which is a third embodiment of the present invention. The tape cassette 110 features a pair of side pockets 101 and 102 provided on both sides 2d and 2e opened at their respective frontal bottom side corners of the cassette case 2 as shown in FIG. 6(B). Rims of the lower flanges 4a, 5a of supply and take-up reels 4, 5, are partly exposed in the respective side pockets 101 and 102 to engage with and be driven by reel driving members which will be explained later. Dust shield 14, which slides in directions $X_1 \leftrightarrow X_2$ may be designed to cover, at its closed position, the side pockets 101 and 102 as well as the loading pocket 7 in conjunction with the front lid 6. The tape cassette 110 of the present invention gives a wider design flexibility to a tape recording/playback system which utilizes the tape cassette 110 for various design possibilities as such systems that:

1) reel driving members of such tape apparatus may be designed to enter the loading pocket 7 together with the tape loading members 24a and 24b of the apparatus, or
2) to enter the side pockets 101 and 102 to drive the reels, or
3) combination of both systems 1) and 2) above.

The design option 1) (system 1) above is desirable to be applied to miniature video tape recorders with a built-in camera, and the design option 2) (system 2) may be good for table top high reliability video tape recorders which require sturdy but bulky tape loading members to enter the loading pocket 7 for stable high speed tape forward and rewind operations where a not enough room is left in the loading pocket 7 to accept the reel driving members. The design option 3) (system 3) may be applied to a special purpose video tape recorders explained in the following.

Figure 7:
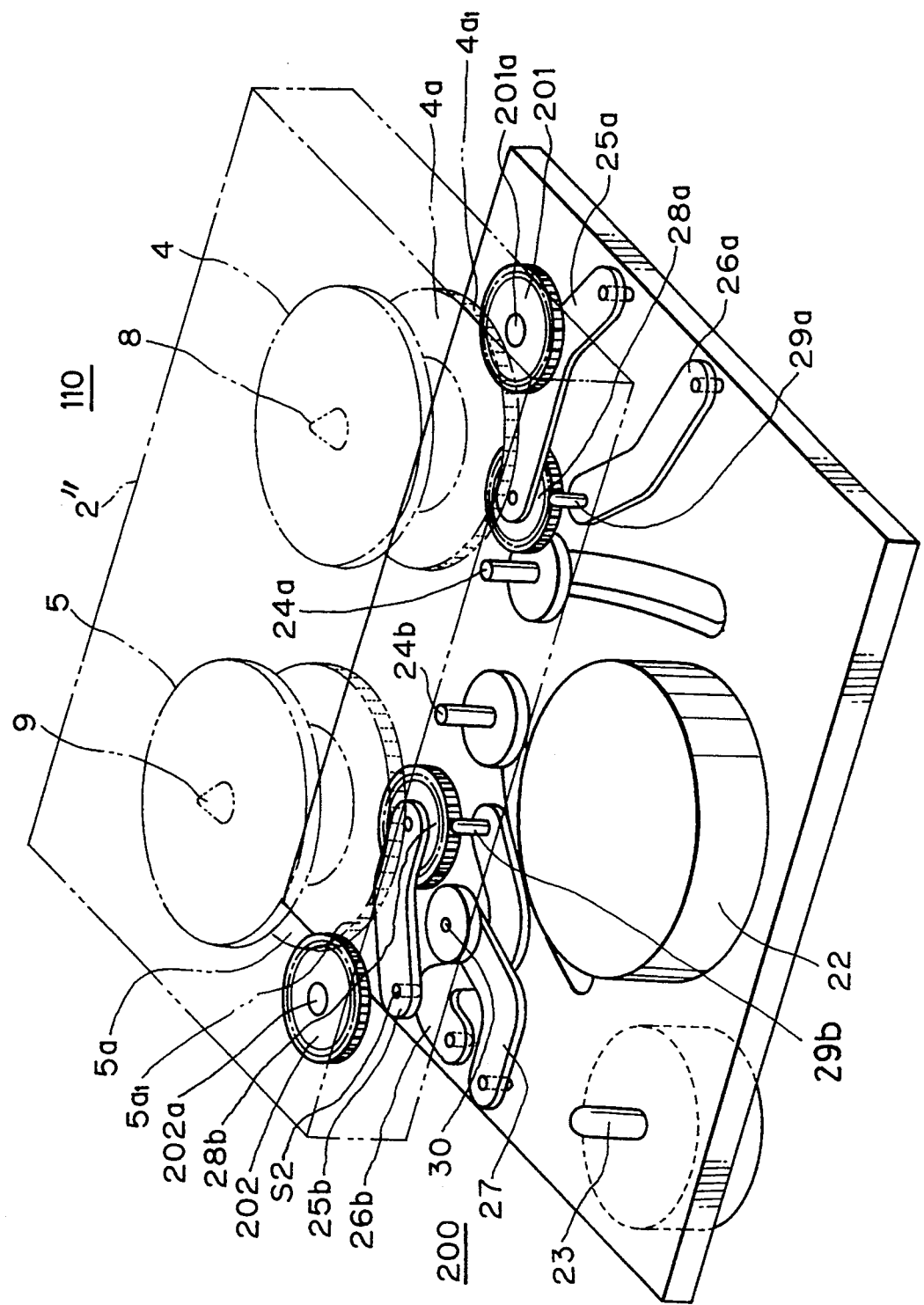
FIG. 7 show how the tape cassette according to the third embodiment shown in FIG. 6, is loaded into another tape apparatus.

FIG. 7 show a tape apparatus 200 designed in accordance with such design option 3) which utilizes the tape cassette of the third embodiment of the present invention. The tape apparatus 200 comprises, in addition to other components including the driving gears 28a and 28b which are employed on the tape apparatus 20 explained before, additional reel driving gears 201 and 202 mounted respectively on shafts 201a and 201a. The additional driving gears 201 and 202 driven by a small motor(not shown), engage with the gear portions 4a1 and 5a1 of the lower flanges 4a and 5a, which are partly exposed within the side pockets 101 and 102 (not shown in FIG. 7) thus are able to drive the supply and take-up reels 4 and 5. The tape apparatus 200 having the above design feature is quite effective for such operation that starting playback operation very quickly after a fast rewinding of the tape, in this operation, the driving gears 28a and 28b are utilized for the fast rewinding of the tape and the additional driving gears 201 and 202 are utilized for the playback operation so that a operation switchover time is minimized, otherwise it would take longer time to reverse the revolving direction of the motor and associated gear trains and disengaging and re-engaging the driving gears or the like. Of the tape apparatus having the system 3 above is capable of other quick changeover operations which include:

a) low reverse (forward) playback right after a fast forward (rewind) of the tape,
b) playback from a specific point to be searched right after a fast forward of the tape.

That is, when switching an operational modes which involve extremely different tape running speeds, the tape cassette 110 having the side pockets 101 and 102 enables the the driving gears 28a, 28b and the additional driving gears 201, 202 of the tape apparatus 200 having different roles each other depending on the operational modes thus a high speed mode-switching is made possible.

In the foregoing description, the tape cassette 1, 100 or 110 employs the supply and take-up reels 4 an 5 having respectively gear portions 4a1 and 5a1 provided at their lower flanges 4a and 5a to be driven, however, instead of utilizing such a gear portion, the lower flange itself may be friction driven by a rubber roller or the like as the reel driving members of the tape apparatus.

In the described embodiments, the tape cassette of the present invention allows the reel driving mechanism of the tape apparatus to enter the loading pocket and to engage with the supply and take-up reels within the loading pocket, this helps a miniaturization of the tape apparatus and for a reason that the driving mechanism does not require tables for supporting the supply and take-up reels, this tape cassette contributes to the miniaturization as well and to reduce a number of components which are otherwise needed for the tape apparatus.

Further, the tape cassette of the present invention has an improved structure for miniaturization of the tape cassette and for dust proof, particularly in the second embodiment having the dust shield 14 having no access openings, which does not require a large displacement stroke that may otherwise increase the fore and aft dimension of the tape cassette 100.

What is claimed is:

1. Tape cassette having a cassette case, and a front lid for holding protectively a magnetic tape wound on a pair of reels within said cassette case, a part of said magnetic tape being extended behind said front lid which opens to expose said part of the magnetic tape to be drawn out of said tape cassette, said tape cassette comprising:

a pair of shafts stationarily provided within said cassette case for supporting respectively and rotatably said pair of reels housed in said cassette case, a loading pocket provided behind said front lid and being open at a bottom of said cassette case to allow tape loading means of a tape recording/playback apparatus to enter into said loading pocket to draw out said part of the magnetic tape upon loading said tape cassette into said tape apparatus, said loading pocket having a rear wall which partitions said reels from said loading pocket, said rear wall having window means for exposing said pair of reels to said loading pocket, said tape recording/playback apparatus having reel driving means for driving said pair of reels;

flange means provided on each of said pair of reels for laterally holding respectively said magnetic tape in said pair of reels, said flange means protruding partially into said loading pocket through said window means to engage with said reel driving means; and shield means provided at a bottom of said cassette case for moving slidingly to close and expose said loading pocket, said shield means and said bottom of said cassette case having no access openings to expose said pair of reels.

2. Tape cassette claimed in claim 1 in which said flange means comprises a lower flange having a gear portion, and a part of said gear portion protrudes into said loading pocket to engage with said reel driving means of said tape recording/playback apparatus.

3. Tape cassette claimed in claim 1 further comprising at least one side pocket provided on one of both sides of said cassette case opened at a bottom side corner of said cassette case, and said flange means being partly exposed in said side pocket to engage with said reel driving means of said tape recording/playback apparatus.

4. Tape recording/playback apparatus adapted to use a tape cassette which comprises a cassette case and a front lid for holding protectively a magnetic tape wound on a pair of reels within said cassette case, a pair of shafts stationarily provided within said cassette case for supporting respectively and rotatably said pair of reels, and a part of said magnetic tape being extended behind said front lid which opens to expose said part of the magnetic tape to be drawn out of said tape cassette, a loading pocket provided behind said front lid and being open at a bottom of said cassette case to allow tape loading means of said tape recording/playback apparatus to enter said loading pocket to draw out said part of the magnetic tape upon loading said tape cassette into said tape recording/playback apparatus, said loading pocket having a rear wall which partitions said reels from said loading pocket, said rear wall having window means for exposing said pair of reels to said loading pocket, flange means provided on each of said pair of reels for laterally holding respectively said magnetic tape in said pair of reels, said flange means protruding partially into said loading pocket through said window means, and shield means provided at a bottom of said cassette case for moving slidingly to close and expose said loading pocket, said shield means and said bottom of said cassette case having no access openings to expose said pair of reels, said tape recording/playback apparatus having reel driving means for entering said loading pocket and engaging with said flange means at a portion thereof protruding into said loading pocket through said window means, whereby said pair of reels is driven by said driving means when said tape cassette is loaded into said tape recording/playback apparatus.

* * * * *